United States Patent [19]

Miyamoto et al.

[11] Patent Number: 4,605,765
[45] Date of Patent: Aug. 12, 1986

[54] NOVEL POLYAMINE

[75] Inventors: Akira Miyamoto; Katsuo Sato; Masahiro Kurokawa, all of Kanagawa, Japan

[73] Assignee: Mitsubishi Gas Chemical Company, Inc., Tokyo, Japan

[21] Appl. No.: 651,024

[22] Filed: Oct. 29, 1984

Related U.S. Application Data

[62] Division of Ser. No. 473,404, Mar. 8, 1983, abandoned.

[30] Foreign Application Priority Data

Mar. 8, 1982 [JP] Japan .................................. 57-36263

[51] Int. Cl.$^4$ ............................................. C07C 87/28
[52] U.S. Cl. .................... 564/367; 528/123; 528/124; 528/405
[58] Field of Search ......................... 564/367, 387, 368

[56] References Cited

U.S. PATENT DOCUMENTS

| | | | |
|---|---|---|---|
| 1,790,042 | 1/1931 | Eisleb | 564/367 X |
| 1,845,403 | 2/1932 | Eisleb | 564/367 X |
| 2,661,291 | 12/1953 | Slifkin | 564/367 X |
| 2,987,547 | 6/1961 | Mahan | 564/367 |
| 3,755,445 | 8/1973 | Hanschke et al. | 564/367 X |
| 4,010,200 | 3/1977 | Kalopissis et al. | 564/367 X |

FOREIGN PATENT DOCUMENTS 987438   3/1965   United Kingdom ................. 564/367

Primary Examiner—Robert V. Hines
Attorney, Agent, or Firm—Sughrue, Mion, Zinn, Macpeak, and Seas

[57] ABSTRACT

A novel polyamine compound, N,N'-bis(3-aminomethylbenzyl)-2-hydroxytrimethylenediamine, having the formula

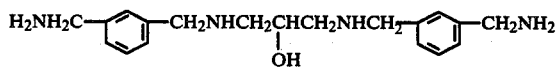

which is useful as a hardening agent for epoxy resins and as a modifier for polyamide resins.

2 Claims, No Drawings

NOVEL POLYAMINE

This is a division of application Ser. No. 473,404 filed 3/8/83 and now abandoned.

FIELD OF THE INVENTION

This invention relates to a novel N,N'-bis(3-aminomethylbenzyl)-2-hydroxytrimethylenediamine useful as a hardening agent for epoxy resins.

BACKGROUND OF THE INVENTION

It is well known that various polyamine compounds are widely used as raw materials for hardening agents of epoxy resins or as components of polyamide resins. In these compounds, typical examples of the polyamine compounds are aliphatic amines such as ethylenediamine, diethylenetriamine, triethylenetetramine, tetraethylenepentamine, pentaethylenehexamine, hexamethylenediamine, etc.; aromatic amines such as phenylenediamine, diaminophenylmethane, diaminophenylsulfone, etc.; aliphatic amines having aromatic ring, such as xylylenediamine, etc.; and alicyclic amines such as bisaminomethylcyclohexane, isophoronediamine, etc. These polyamine compounds each has the reactivity of the amino group as the specific feature caused by the active hydrogen and are used for various purposes. Further, polyamine compounds which have been modified in a manner suitable for the specific polyamine compound have been widely used and, for example, the modified compounds are used as hardening agents for epoxy resins. In particular, xylylenediamine such as m-xylylenediamine has a property specific to aliphatic diamines having an aromatic ring and is used as a main raw material for polyamide or a main raw material for a hardening agent for epoxy resin. Furthermore, a modified compound obtained by reacting the above compound with phenol and formaldehyde, or with methyl methacrylate, acrylonitrile or an epoxy compound is widely used as an epoxy resin itself or a hardening agent for epoxy resins. It is known that, when the above modified compound is used as a hardening agent for epoxy resins, the low-temperature hardening property of the epoxy resin is greatly improved and the hardened product of the epoxy resin shows excellent chemical resistance and excellent gloss and appearance. However, the hardening agent and the hardened product show a whitening phenomenon caused by the absorption of carbon dioxide in the atmosphere and the hardened product has problems that the product is hard and has no flexibility as well as is inferior in adhesion and impact resistance.

However, for further increasing the acceptable range of modification of m-xylylenediamine so as to meet a wide variety of use, it has been desired to convert m-xylylenediamine into more polyfunctional polyamine compounds without adversely affecting the characteristics of m-xylylenediamine.

SUMMARY OF THE INVENTION

An object of this invention is to provide a novel polyamine compound which satisfies the above requirement.

That is, the present inventors have found that the novel polyamine compound, N,N'-bis(3-aminomethylbenzyl)-2-hydroxytrimethylenediamine, can be obtained by reacting m-xylylenediamine and epichlorohydrin in the presence of an alkali, and also that the novel polyamine compound thus obtained exhibits excellent properties as a hardening agent for epoxy resin or as a main material for a modified hardening agent for epoxy resin, and further as a modifier for polyamide resins.

N,N'-bis(3-aminomethylbenzyl)-2-hydroxytrimethylenediamine of this invention is a compound having a structure that two-m-xylylenediamine molecules are connected with each other via a 2-hydroxypropylene bond, i.e., a polyamine compound having two primary amino groups and two secondary amino groups in the molecule and is represented by the formula:

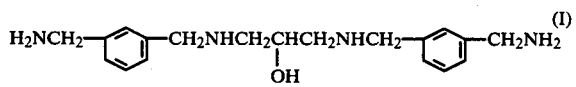

DETAILED DESCRIPTION OF THE INVENTION

A preferred example of a method for producing the novel polyamine compound comprises reacting m-xylylenediamine with epichlorohydrin in the presence of an alkali metal hydroxide and removing the water and alkali metal chlorides formed during the reaction from the reaction product to give the desired polyamine compound. The reaction can be conducted stoichiometrically using 2 mols of m-xylylenediamine per mol of epichlorohydrin, but it is preferred to use m-xylylenediamine in an excessive amount to ensure a smooth reaction. Usually, m-xylylenediamine is used in an amount of from about 6 to about 20 mols, preferably about 6 to about 10 mols, per mol of epichlorohydrin. The excess of m-xylylenediamine can be recovered from the reaction mixture after completion of the reaction and can, of course, be used again as the raw material.

Examples of alkali metal hydroxides which can be used in the reaction are sodium hydroxide or potassium hydroxide and the alkali metal hydroxide can be used in a solid form or in the form of its aqueous solution. When the alkali metal hydroxide is used in a solid form, it is preferred to use a small amount of water. The alkali metal hydroxide can be used in an amount stoichiometrically equivalent to the amount of epichlorohydrin but usually a slightly excess amount of the alkali metal hydroxide is preferably used.

In reacting m-xylylenediamine with epichlorohydrin, it is particularly preferred to perform the reaction while adding dropwise epichlorohydrin to m-xylylenediamine and hence the reaction time usually does not exceed over 5 hours including the time required for dropwise addition. The reaction temperature can be selected in the range of about 40° to about 100° C., with about 60° C. being particularly preferred.

The reaction mixture obtained by the reaction under the above reaction conditions is then heated under reduced pressure, for example, to a temperature below about 100° C. under a reduced pressure of about 100 mmHg to distil off the water formed during the reaction. With distilling off of water, alkali metal chlorides formed as by-products are deposited in the reaction mixture and, after completing the removal of water, can be removed by filtration. The filtrate is further heated under reduced pressure, for example, at a temperature below about 200° C. under a reduced pressure of lower than 5 mmHg to distil off unreacted m-xylylenediamine. When alkali metal chlorides are precipitated in the residue in a distillation still, the chlorides are removed by filtration, whereby substantially pure N,N'-bis(3- aminomethylbenzyl)-2-hydroxytrimethylenediamine can be finally obtained as the reaction product. The reaction product thus obtained may contain a small proportion of the compound having the formula II:

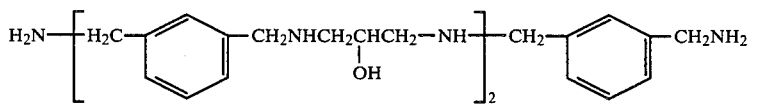

but the reaction product obtained can be used as it is for the purposes of the polyamine of this invention.

The practical usefulness of the novel polyamine compound of this invention, N,N'-bis(3-aminomethylbenzyl)-2-hydroxymethylenediamine thus obtained will become appearent from the following description.

When the hardening reaction of an epoxy resin was attempted using the polyamine compound of this invention as a hardening agent, it was confirmed that the hardening reaction occurred at a low temperature, i.e., 0° to 5° C., and also the flexibility of the hardened product was far superior to that of a hardened product obtained using m-xylylenediamine as the hardening agent. Also, a whitening phenomenon caused by absorption of carbon dioxide in the atmosphere observed with m-xylylenediamine as a hardening agent did not occur when the polyamine compound of this invention was used. Further, when an epoxy resin is repeatedly coated in multi-layered form, the faults that the occurrence of peeling off of the layer at the bonded face and the reduction in impact resistance are always inevitable, but these faults were not observed with the epoxy resin hardened using the polyamine compound of this invention as a hardening agent.

On the other hand, it has been observed that the polyamine resin obtained by co-condensing polymerizing the polyamine compound of this invention as one of diamine components for polyamide resin and a dibasic acid component shows better flexibility and impact resistance. Furthermore, since the polyamine compound of this invention is a polyfunctional compound having two primary amines, two secondary amines, and one secondary alcohol, the compound of this invention can be used as a raw material for a reactive high molecular weight compound.

The hardening agent for epoxy resins composed of the polyamine compound of this invention may contain the polyamine compound shown by the above formula I as the effective component and the polyamine compound can be used solely or as a mixture with other amine compounds. Examples of other amine compounds which can be used are aliphatic polyamines, aromatic polyamines, aliphatic polyamines having aromatic ring, and alicyclic polyamines. Of these amine compounds, a particularly preferred example is methaxylylenediamine. The proportion of other amine compound used together with the hardening agent of this invention is preferably less than 10% by weight of the polyamine compound shown by the formula I. Furthermore, if desired, other known hardening agents for epoxy resins, such as acrylonitrile-modified polyamines, polyamidoamine compounds, polyamine/epoxy compound addition products, polyamine/phenolic compound/formaldehyde condensation products, etc., may be used together with the polyamine compound of this invention.

The epoxy resin to be hardened by the hardening agent composed of the polyamine compound of this invention has at least two epoxy groups per molecule and examples of such epoxy resins include glycidyl-type epoxy resins which are the glycidyl compounds of polyhydric alcohols, polyhydric phenols, polycarboxylic acids, or polyamines and non-glycidyl-type epoxy resins.

The hardening agent of this invention is usually incorporated into the epoxy resin in a proportion based on an active hydrogen equivalent of the hardening agent of this invention and an epoxy equivalent of the epoxy resin, but even if the hardening agent is used in a large or small proportion, the desired property of the hardened epoxy resin is sufficiently obtained and hence there is no particular limitation on the proportion. In hardening an epoxy resin using the hardening agent of this invention, various additives such as diluents, fillers, pigments, etc., may be used according to the utility of the hardened resin.

The hardening agent of this invention has various excellent properties, for exmaple, good compatibility with an epoxy resin and no whitening phenomenon caused by absorbing carbon dioxide in the atmosphere as well as the hardened resin shows good transparency and gloss, good flexibility, strong adhesive property and high peeling resistance, and good impact resistance and chemical resistance.

The present invention is further illustrated by the following exmaples and reference example.

EXAMPLE 1

In a four-necked flask equipped with a stirrer, a dropping funnel, a thermometer, and a condenser were placed 1088 g (8 mols) of m-xylylenediamine and 82 g of an aqueous sodium hydroxide solution at a concentration of 50% (1.02 mols as sodium hydroxide) and, while stirring the mixture in a nitrogen atmosphere, 93 g (1 mol) of epichlorohydrin was added dropwise to the mixture from the dropping funnel over a period of one hour. The reaction temperature during the dropwise addition was maintained at 60° C. and, after completion of the addition, the mixture was further stirred for two hours at the same temperature to continue the reaction.

Then, while maintaining the content in the flask at a temperature of 90° to 100° C., the reaction mixture thus obtained was distilled under reduced pressure of about 100 mmHg to distil off water. After distillation, sodium chloride precipitated in the still residue was removed by filtration and the mother liquid was distilled under reduced pressure of about 2.5 mmHg at a temperature of 130° C. to distil off any excess of m-xylylenediamine. The still residue was 305 g of a colorless transparent viscous liquid (the yield corresponded to 93.0% of the theoretical value based on epichlorohydrin). The product thus obtained had an amine value of 669 (mg KOH/g) and is referred to "Product A" in the Reference Example 1.

EXAMPLE 2

The reaction product obtained in Example 1 was subjected to a precise distillation using a centrifugal high-vacuum evaporator to provide a fraction having boiling point of 165°–170° C./4×10⁻³ mmHg. The degree of vacuum was measured after cold trapping.

The properties of the compound obtained as the above fraction are as follows:

Specific gravity $d_{25}^{25}$: 1.137.
Refractive index $n_D^{20}$: 1.590.
Amine value (mg KOH/g): 679 (calculated 681).
Molecular weight: 326 (calculated 328) (by the osmotic pressure method).
Elemental analysis for $C_{19}H_{28}N_4O$:

|  | C | H | N |
|---|---|---|---|
| Found: | 69.48% | 8.44% | 17.12% |
| Calculated: | 69.51% | 8.54% | 17.07% |

Infrated Absorption Spectrum (liquid film): Characteristic absorption peaks, appear at 3,000–3,500 cm⁻¹ (hydroxyl group); 3,000–3,200, 1,580, 1,015, and 850 cm⁻¹ (primary and secondary amino groups); 1,600 and 700–780 cm⁻¹ (phenyl group), etc.

Nuclear Magnetic Resonance Spectrum: (solvent: D-substituted chloroform (CDCl₃); concentration, 20%)

| (ppm) | Type of Proton |
|---|---|
| 7.13 | H of benzene ring |
| 3.75 | H of methylene of benzylmethyl group |
| 2.65, 2.56 | H of methylene of propylene group |
| 2.05 | H of primary and secondary amino groups |

It is understood from the above results that the reaction product is N,N′-bis(3-aminomethylbenzyl)-2-hydroxytrimethylenediamine.

EXAMPLE 3

In the apparatus as used in Example 1 were placed 816 g (6 mols) of m-xylylenediamine and 88 g of an aqueous sodium hydroxide solution at a concentration of 48% (1.01 mols as sodium hydroxide) and, while stirring the mixture in a nitrogen atmosphere, 93 g (1 mol) of epichlorohydrin was added dropwise to the mixture over a period of one hour. The reaction temperature during the dropwise addition was maintained at 50° C. and, after completion of the addition, the reaction was further continued for two hours at the same temperature. After the reaction was completed, the reaction mixture was treated in the same manner as described in Example 1 to obtain 290 g of a colorless transparent viscous liquid, having an amine value of 677 (mg KOH/g).

It was observed by the analysis of the acrylated product with the aid of the gel permeation chromatography that the liquid product contained 5.1% by weight of m-xylylenediamine, 81.6% by weight of the component represented in the formula I and 11.8% by weight of the component represented by the formula II.

The product thus obtained is referred to "Product B" in the Reference Example 1.

REFERENCE EXAMPLE 1

An epoxy resin was hardened with the hardening agents prepared in Examples 1 (Product A) and 3 (Product B) above, and the properties and the chemical resistance of the hardened epoxy resin were determined.

The epoxy resin used was "Epikote #1001-X-75" (tradename of Yuka Shell Epoxy Co., Ltd.) and compounded with the hardening agent A (Example 1) or B (Example 3) in a proportion of 9 phr (parts per hundred parts of resin). The resulting resin mixture was coated on a cold-rolled steel plate in a thickness of 200 microns and hardened for 7 days at a temperature of 20° C. The results obtained by determination of properties of the hardened product are shown in Table 2 and the results of measuring resistance of the hardened products against various chemicals are shown in Table 3.

TABLE 2

|  | Product A | Product B |
|---|---|---|
| Pencil hardness test (JIS K-5400) | HB | HB |
| Cross-cut adhesion test (JIS K-5400) | 100/100 | 100/100 |
| Erichsen test (mm) | 9.5 | 9.0 |
| Impact test Front (cm) (½ × 500 g) Back | 50 50 | 50 50 |

TABLE 3

|  | Product A | Product B |
|---|---|---|
| Appearance before chemical resistance test | good | good |
| Appearance after treating with: |  |  |
| 10% sodium hydroxide⁽¹⁾,⁽²⁾ | good | good |
| 5% sulfuric acid⁽¹⁾,⁽²⁾ | " | " |
| 5% phosphoric acid⁽¹⁾,⁽²⁾ | " | " |
| 2% formic acid⁽¹⁾,⁽²⁾ | " | " |
| 5% lactic acid⁽¹⁾,⁽²⁾ | " | " |
| 5% citric acid⁽¹⁾,⁽²⁾ | " | " |
| 5% acetic acid⁽¹⁾,⁽²⁾ | " | " |
| 5% acetic acid/10% ethanol⁽¹⁾,⁽²⁾ | " | " |
| Methanol⁽²⁾ | " | " |
| Ethanol⁽²⁾ | slight blister | slight blister |
| Gasoline⁽²⁾ | good | good |
| 15% methanol/85% gasolin⁽²⁾ | " | " |
| 15% ethanol/85% gasolin⁽²⁾ | " | " |
| Toluene⁽²⁾ | slight blister | slight blister |
| Boiling water⁽³⁾ | swelling | swelling |
| Humidity resistance⁽⁴⁾ | good | good |
| Spraying of sodium chloride solution | good | good |

⁽¹⁾Aqueous solution.
⁽²⁾Immersed for 7 days at room temperature.
⁽³⁾Immersed for 6 hours.
⁽⁴⁾For 14 days, at 49° C. and 98% in relative humidity.
⁽⁵⁾For 14 days with aqueous 5% sodium chloride solution.

While the invention has been described in detail and with reference to specific embodiment thereof, it will be apparent to one skilled in the art that various changes and modifications can be made therein without departing from the spirit and scope thereof.

What is claimed is:

1. N,N′-Bis(3-aminomethylbenzyl)-2-hydroxytrimethylenediamine having the formula:

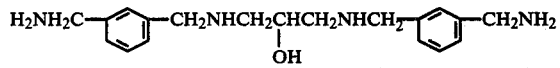

2. A hardening agent for epoxy resins comprising, as a main component, N,N′-bis(3-aminomethylbenzyl)-2-hydroxytrimethylenediamine having the formula:

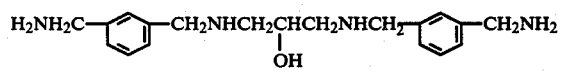

* * * * *